United States Patent
Nanu et al.

(10) Patent No.: US 10,334,152 B2
(45) Date of Patent: Jun. 25, 2019

(54) IMAGE ACQUISITION DEVICE AND METHOD FOR DETERMINING A FOCUS POSITION BASED ON SHARPNESS

(71) Applicant: FotoNation Limited, Galway (IE)

(72) Inventors: Florin Nanu, Bucharest (RO); Alexandru Malaescu, Bucharest (RO); Cosmin Clapon, Bucharest (RO)

(73) Assignee: FotoNation Limited, Galway (IE)

( * ) Notice: Subject to any disclaimer, the term of this patent is extended or adjusted under 35 U.S.C. 154(b) by 0 days.

(21) Appl. No.: 15/834,653

(22) Filed: Dec. 7, 2017

(65) Prior Publication Data

US 2018/0109719 A1    Apr. 19, 2018

Related U.S. Application Data

(63) Continuation-in-part of application No. 15/231,436, filed on Aug. 8, 2016, now Pat. No. 10,148,943.

(51) Int. Cl.
*G03B 13/00* (2006.01)
*H04N 5/232* (2006.01)
(Continued)

(52) U.S. Cl.
CPC ........... *H04N 5/23212* (2013.01); *G02B 7/28* (2013.01); *G03B 13/36* (2013.01);
(Continued)

(58) Field of Classification Search
CPC ........... H04N 5/23212; H04N 5/23219; H04N 5/144; H04N 5/23261; G02B 7/28;
(Continued)

(56) References Cited

U.S. PATENT DOCUMENTS 8,300,112 B2 * 10/2012 Hirai ................. H04N 5/23212
                                                    348/222.1
8,797,448 B2    8/2014 Capata et al.
(Continued)

FOREIGN PATENT DOCUMENTS

WO    2008/018887 A1    2/2008
WO    2012/041892 A1    4/2012
(Continued)

OTHER PUBLICATIONS

Nishiyama, M., et al, "Facial Deblur Inference using Subspace Analysis for Recognition of Blurred Faces", 8 pages.

*Primary Examiner* — Ngoc Yen T Vu

(57) ABSTRACT

A method for acquiring an image comprises acquiring a first image frame including a region containing a subject at a first focus position; determining a first sharpness of the subject within the first image frame; identifying an imaged subject size within the first image frame; determining a second focus position based on the imaged subject size; acquiring a second image frame at the second focus position; and determining a second sharpness of the subject within the second image frame. A sharpness threshold is determined as a function of image acquisition parameters for the first and/or second image frame. Responsive to the second sharpness not exceeding the first sharpness and the sharpness threshold, camera motion parameters and/or subject motion parameters for the second image frame are determined before performing a focus sweep to determine an optimal focus position for the subject.

9 Claims, 6 Drawing Sheets

(51) Int. Cl.
   *G02B 7/28*   (2006.01)
   *G03B 13/36*  (2006.01)
   *G02B 7/36*   (2006.01)
   *H04N 5/14*   (2006.01)

(52) U.S. Cl.
   CPC ..... *H04N 5/23219* (2013.01); *H04N 5/23261* (2013.01); *G02B 7/36* (2013.01); *H04N 5/144* (2013.01)

(58) Field of Classification Search
   CPC .......... G02B 7/36; G03B 13/32; G03B 13/34; G03B 13/36
   USPC .......................................... 348/345, 349, 352
   See application file for complete search history.

(56) References Cited

U.S. PATENT DOCUMENTS

| | | | | |
|---|---|---|---|---|
| 8,849,064 | B2* | 9/2014 | Mocanu | G06T 5/003 382/284 |
| 9,288,377 | B2* | 3/2016 | Peng | H04N 5/2258 |
| 9,743,001 | B1 | 8/2017 | Stec | |
| 9,769,375 | B2* | 9/2017 | Bigioi | H04N 5/2254 |
| 9,905,031 | B2* | 2/2018 | Zhang | G06T 7/00 |
| 10,097,751 | B2* | 10/2018 | Tanimoto | G03B 13/36 |
| 2010/0123782 | A1* | 5/2010 | Yata | H04N 5/232 348/169 |
| 2010/0283868 | A1* | 11/2010 | Clark | G11B 27/034 348/231.4 |
| 2011/0002680 | A1* | 1/2011 | Narasimha | G03B 3/00 396/124 |
| 2014/0092272 | A1* | 4/2014 | Choi | H04N 5/23293 348/222.1 |
| 2017/0223275 | A1* | 8/2017 | Yanagisawa | H04N 5/23293 |

FOREIGN PATENT DOCUMENTS

| | | |
|---|---|---|
| WO | 2014/005783 A1 | 1/2014 |
| WO | 2014146983 A2 | 9/2014 |
| WO | 2016/000874 A1 | 1/2016 |
| WO | 2016/091545 A1 | 6/2016 |

* cited by examiner

IMAGE ACQUISITION DEVICE AND METHOD FOR DETERMINING A FOCUS POSITION BASED ON SHARPNESS

FIELD

The present invention relates to an image acquisition device and a method of acquiring an image.

BACKGROUND

Referring now to FIG. 1, a typical digital image acquisition device 10 or a camera module for an image acquisition device comprises a lens 12 connected to an image sensor 14 which generates image information when exposed through the lens 12. Acquired image information is fed downstream from the sensor 14 to an image correction stage 16 where the raw image information is corrected for example, for color balancing or for distortion correction such as disclosed in WO 2014/005783 (Ref: FN-384), the disclosure of which is incorporated herein by reference. In FIG. 1, the image correction stage 16 is shown as a single block, however, it will be appreciated that this functionality can be implemented in many different ways either directly in an image processing pipeline connected to the sensor 14 or through processing image information stored in memory (not shown).

Acquired image information can be employed both for automatic exposure (AE) and automatic focus (AF) control 18. AE controls the timing 20 of the image sensor 14 to suitably expose captured images. AF automatically adjusts the lens 12 through its driver circuitry 22 to obtain focus on a subject at a given distance.

While some AF systems can either use separate contrast sensors within the camera to detect an optimal focus position (passive AF) or emit a signal to illuminate or estimate the distance to a subject before focussing at that distance (active AF), small multifunction devices such as mobile phones, tablet computers, personal digital assistants and portable music/video players, often do not include separate image and autofocus sensors and instead rely on acquired image information to perform autofocus.

Such multifunction devices typically use the focus driver 22 to successively set the position of the camera lens (or lens assembly) 12 to a specified number of lens positions or points of interest (POI) and evaluate focus (e.g. contrast) at one or more points in images acquired at each lens position to determine an optimal focus position—maximum contrast is assumed to correspond to maximum sharpness or "best" focus.

Employing points distributed across an image to measure contrast and assess focus is typically referred to as contrast detection auto-focus (CDAF). CDAF has limited utility in that it does not necessarily prioritize focus on one portion of an image of another. Even if CDAF were only performed on a specified region of an image, it also suffers in low-light conditions where image contrast is low. On the other hand, approaches such as face detection auto-focus (FDAF), for example, as explained in WO2016/000874 (Ref: FN-396), the disclosure of which is incorporated herein by reference, involve identifying a face region within an image and, using anthropometric data such as the known distance between eyes of between 65-70 mm, to achieve focus and maximize the sharpness of the face region. Other forms of subject feature for which the typical dimensions are known, for example, a car, can also provide the basis for an auto-focus mechanism and the present specification applies equally to such subject features. In any case, auto-focussing based face detection or face-equivalents can be quick by comparison to more traditional contrast based approaches and can also provide improved performance in low light conditions.

Nonetheless, whether using CDAF, FDAF or any equivalent scheme, performing a sweep through a number of POI to measure the sharpness of points in successive frames in a sequence with a view to determining which provides optimal focus can take some time and during this time, each acquired image being previewed before final image acquisition can appear blurred to a greater or lesser extent. This focus hunting process can be slow and visually unpleasant.

Some examples of methods which deal with images which include blurred features include:

"Facial Deblur Inference using Subspace Analysis for Recognition of Blurred Faces", Masashi Nishiyama et al (http://research-srv.microsoft.com/pubs/140476/Final%20Version.pdf) which discloses using information derived from a training set of blurred faces where blurred faces degraded by the same PSF are similar to one another to provide statistical models representing predefined PSF sets in a feature space. A query image is deblurred using the PSF corresponding to that model so that the deblurred face might be recognised.

U.S. Pat. No. 8,797,448 (Ref: FN-363) which discloses acquiring a scene including multiple features with a digital image acquisition device; identifying a first group of pixels that correspond to a first feature within the scene; adjusting an optic in real time to a first focus position to focus the device on the first feature; and capturing a first digital image at the first focus position. A second group of pixels that correspond to a second feature within approximately the same scene is identified; the optic is adjusted in real time to a second focus position to focus the device on the second feature; and a second digital image is captured at the second focus position. The first and second digital images including the first and second features are registered; and either stored, transmitted, combined, captured or displayed together.

WO2012/041892 (Ref: FN-361) which discloses an auto-focus method involving acquiring an image of a scene that includes one or more out of focus faces and/or partial faces. The method includes detecting one or more of the out of focus faces and/or partial faces within the digital image by applying one or more sets of classifiers trained on faces that are out of focus. One or more sizes of the one of more respective out of focus faces and/or partial faces is/are determined within the digital image. One or more respective depths is/are determined to the one or more out of focus faces and/or partial faces based on the one or more sizes of the one of more faces and/or partial faces within the digital image. One or more respective focus positions of the lens is/are adjusted to focus approximately at the determined one or more respective depths.

It will be appreciated that there are number of factors, other than lens position, which can contribute to whether or not an acquired image appears sharp including: camera shake (hand motion, vehicle motion, etc.); and subject motion during the exposure time of an image. Also, it will be appreciated that any sharpness measure based on an image feature such as a face will be impacted by:

Face type (hair colour, amount of hair on the face, glasses, etc.);
Distance to the subject;
Ambient light type/level (ISO level/noise, etc.); or
Lens sharpness function model.

So while it can be possible to determine a lens POI providing a maximum contrast and so optimal focus for a feature such as a face, it is not possible to determine from an absolute contrast or sharpness measurement whether or not an image or image feature is in optimal focus.

As such, AF systems continue to suffer from focus hunting artefacts.

SUMMARY

According to the present invention there is provided a method of acquiring an image according to claim 1.

Embodiments can provide a sharpness measure for an image region (e.g. face, eyes) based on image acquisition parameters and this measure can be employed to determine if a lens sweep which might improve focussing is required or not.

Embodiments use a measure of the stability of a detected face to determine when to switch between face detection based auto-focus and any other form of active or passive auto-focus.

BRIEF DESCRIPTION OF THE DRAWINGS

An embodiment of the invention will now be described by way of example, with reference to the accompanying drawings, in which.

DESCRIPTION OF THE EMBODIMENT

Figure 1:
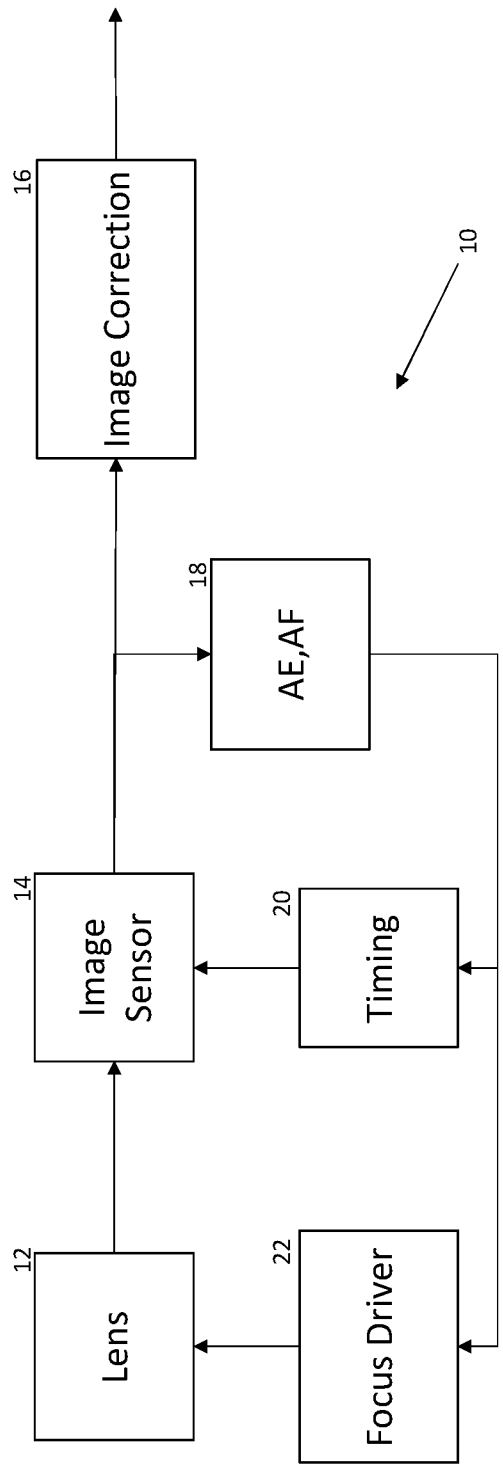
FIG. 1 shows schematically the components of a prior art image acquisition device.
Figure 2:
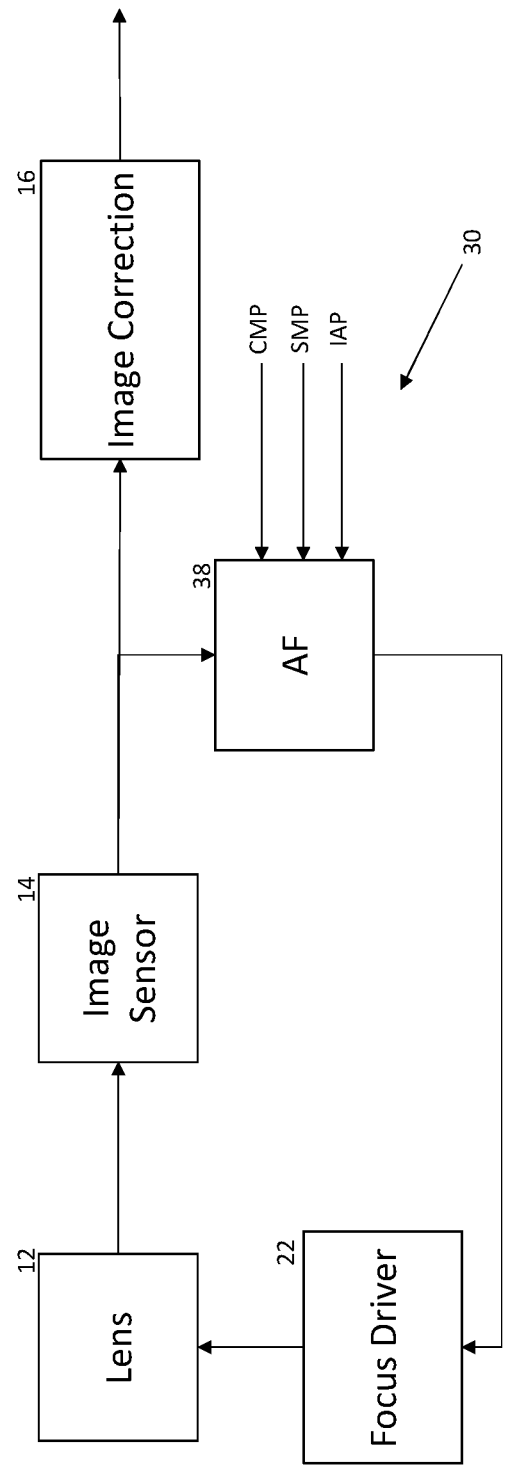
FIG. 2 shows schematically the relevant components of an image acquisition device according to an embodiment of the present invention.

Referring now to FIG. 2, an autofocus system 38 according to an embodiment of the present invention draws information from a number of sources within an image acquisition device 30 to determine if a focus sweep might be required or not. (Details of the AE system of FIG. 1 are omitted for clarity).

Figure 3:
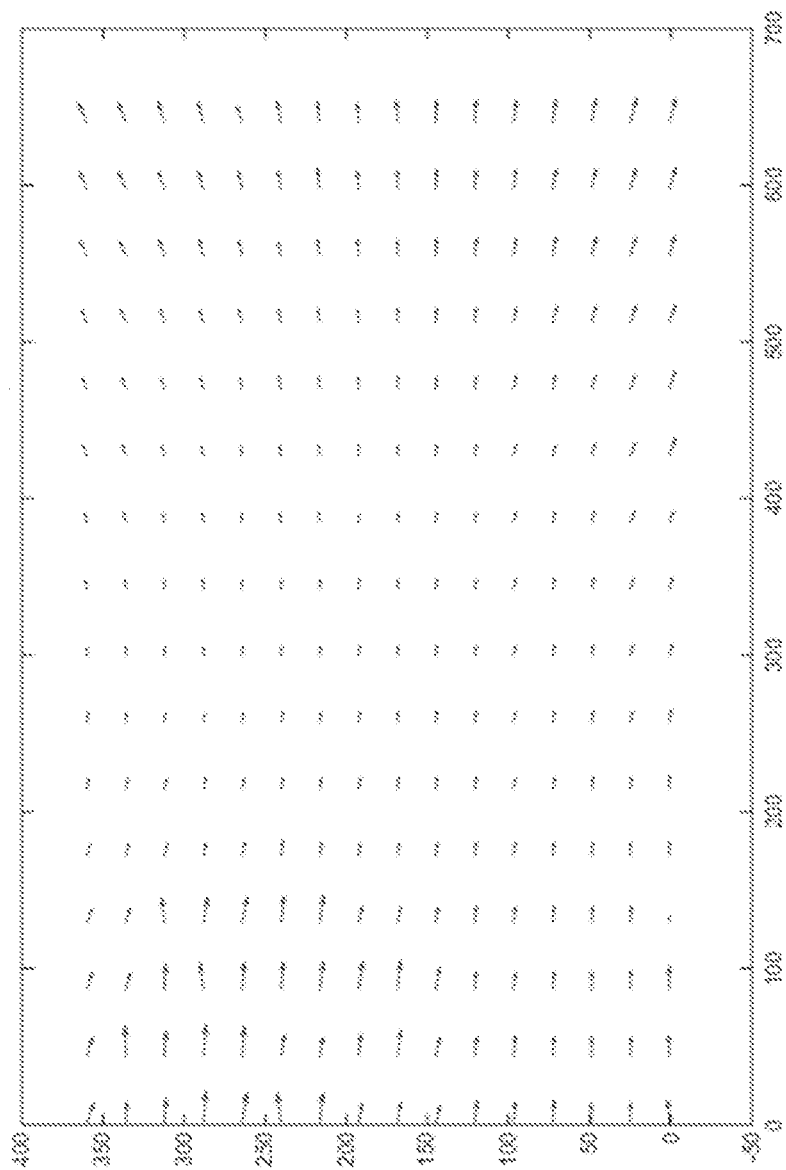
FIG. 3 shows a frame-to-frame displacement matrix of motion vectors employed in one embodiment of the present invention.

It is known to extract either intra-frame or frame-to-frame camera motion parameters (CMP) for example, to provide image stabilisation within a video sequence, as disclosed in U.S. application Ser. No. 15/048,149 filed 19 Feb. 2016 (Ref: FN-474) the disclosure of which is incorporated herein by reference. CMP can comprise a simple measure of camera inertial measurement unit (IMU) outputs from either accelerometers and/or gyroscopes indicating translational and rotational movement of the camera within a frame or from frame-to-frame. Alternatively, a displacement map V[ ], such as shown in FIG. 3, estimating the frame to frame motion between any given input frame N and a preceding (or succeeding) frame N−1 can be determined, for example, as disclosed in WO2014146983 (Ref: FN-389) the disclosure of which is incorporated herein by reference, as an indicator of camera frame-to-frame motion.

In any case, the AF system 38 acquires such CMP information from either from an IMU and/or any other processing modules (not shown) within the image acquisition device 30 to indicate intra-frame or frame-to-frame camera motion.

As well as camera motion, it is known for an acquisition device to detect and track a subject, for example, a detected face, through a sequence of acquired images, for example, as disclosed in WO2008/018887 (Ref: FN-143) and related cases, the disclosure of which is incorporated herein by reference. Thus, the AF system 38 of the embodiment can obtain either intra-frame or frame-to-frame subject motion parameters (SMP) i.e. x, y displacement parameters for a region of interest within an image comprising a subject being tracked either within frame N or between frame N and a preceding (or succeeding) frame N−1 from any processing modules (not shown) within the image acquisition device 30 performing such analysis.

Finally, the AF system 38 can extract image acquisition parameters (IAP) such as sensor gain, exposure time, light level, lens position (subject distance), etc. for any given frame.

Figure 4:
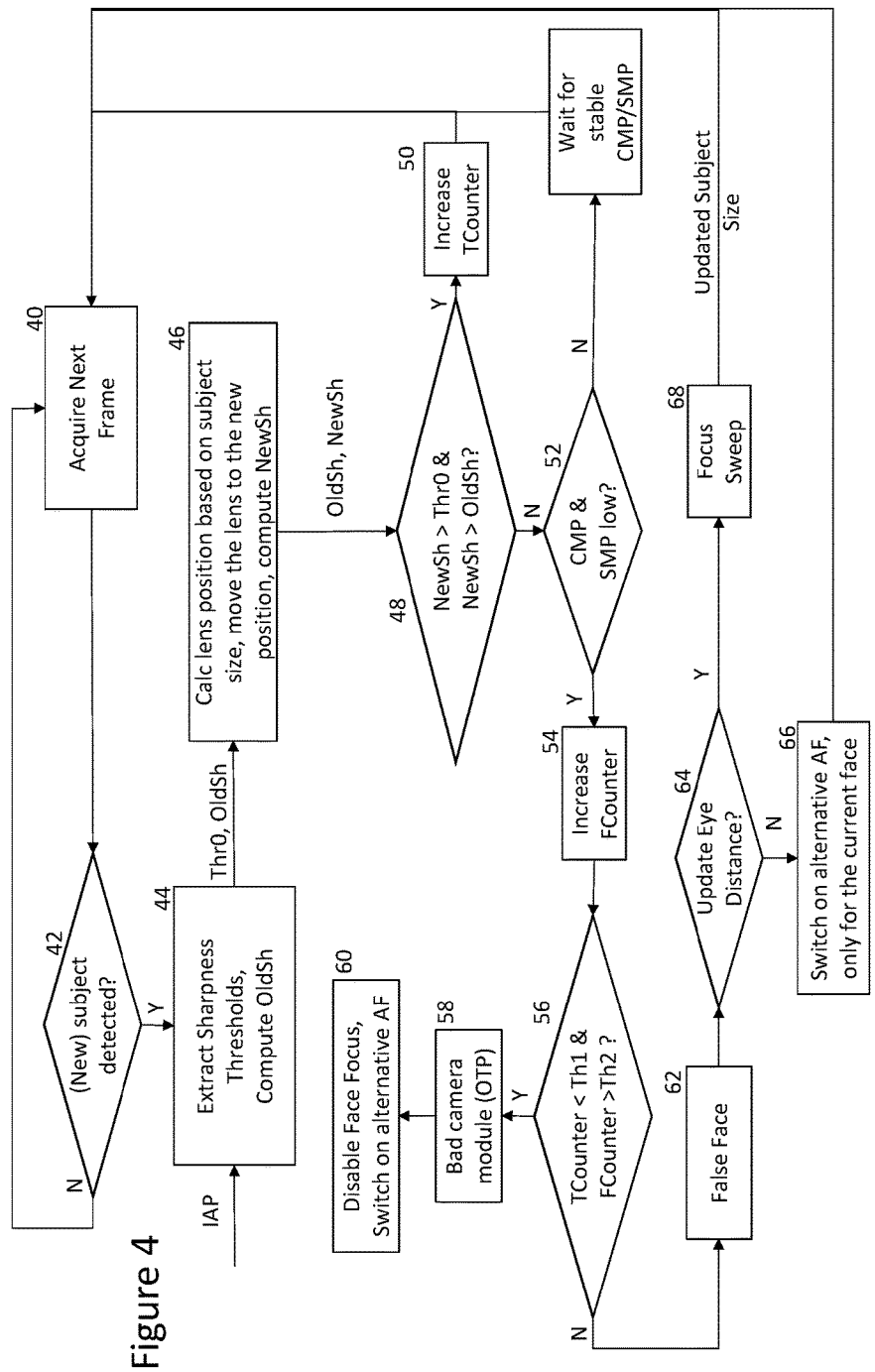
FIG. 4 illustrates a method for acquiring an image according to an embodiment of the present invention.

Referring now to FIG. 4, there is a shown a method for acquiring an image according to an embodiment of the present invention. The embodiment is based on the principle that it is advantageous, where possible, to operate in a FDAF or face-equivalent type mode, rather than a CDAF or similar AF mode in order to maintain focus on a desired region, for example, a face region, within an image. As mentioned, this is because FDAF can operate more quickly and performs better in low light conditions—however, it remains desirable only to perform a focus sweep as a last resort.

The method of FIG. 4 begins once an image is captured at step 40—at this stage, the camera may be either operating in FDAF mode or an alternative AF mode.

If the camera has been operating in FDAF mode, then a subject will have been tracked from a previous frame, otherwise, the method is checking to determine if a new subject has been detected and if this might be used for focussing. If a focus subject such as a face region is detected, step 42, the method continues, but if not, the next frame is acquired using an alternative AF mode and reverts to step 40.

At step 44, the method extracts sharpness thresholds as a function of IAP including distance to the detected subject; and ambient light level. Thus for example, for a given distance to a subject and for a given light level, the method establishes a threshold level of sharpness against which a next acquired image will be assessed.

Figure 5:
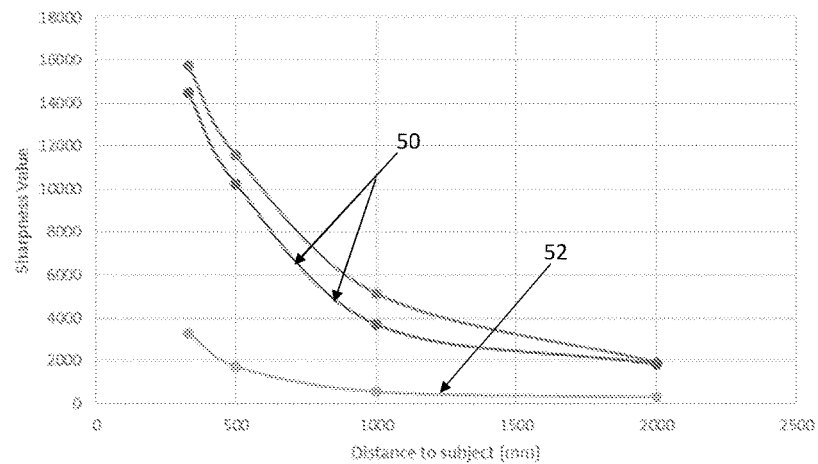
FIGS. 5 and 6 illustrate sharpness functions for different subjects at different distances and light levels respectively.

FIG. 5 includes a number of curves representing maximum sharpness values computed at different distances (330 mm, 500 mm, 1000 mm, 1500 mm, 2000 mm) to different subjects at a constant light level of 20 lux (and at a fixed exposure and ISO/gain level) for a typical camera. Curves 50 correspond to two different real faces, while curve 52 corresponds to a real size printed image.

Figure 6:
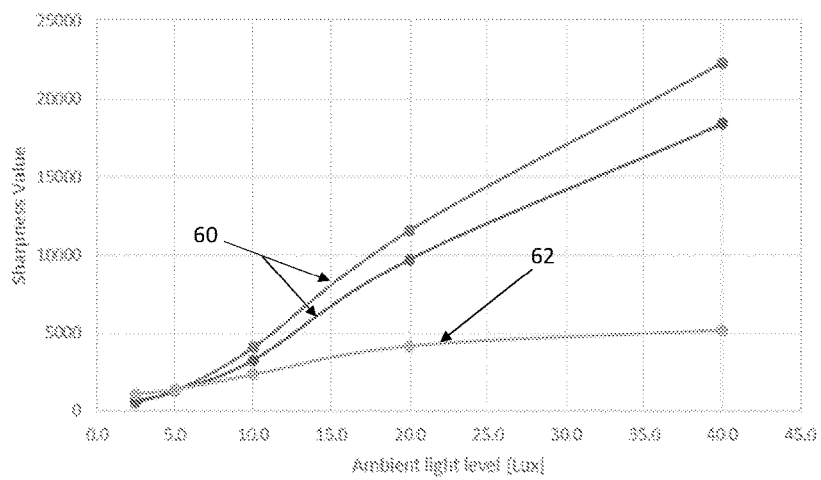

FIG. 6 on the other hand includes a number of curves representing maximum sharpness values computed at different ambient light levels at a fixed distance (500 mm) to the subject (and at a fixed exposure and ISO/gain level) for a typical camera. Again, curves 60 correspond to two different real faces, while curve 62 corresponds to a real size printed image.

It will be appreciated from FIGS. 5 and 6 that there is distance to a subject above which and a light level threshold below which the sharpness value become very small and noisy.

Multiple sets of curves such as shown in FIGS. 5 and 6 might be required to take into account variable ISO/gain levels and exposure times.

It will therefore be seen that when imaging a face at a given distance, light level, exposure time and given ISO/gain level, for a given camera, there is an expectation of the maximum sharpness which might be attained for a face region including a real face. In a simple implementation, this might comprise a simple average of the level of one of curves 50 and one of curves 60 for the subject distance and light level respectively at a given ISO/gain level and exposure time. Given the maximum value based on IAP used to acquire the present image, a sharpness threshold ThrO can be calculated as a fraction of the maximum value, say 60%.

It will be appreciated that sharpness functions such as those shown in each of FIGS. 5 and 6 may need to be calculated and calibrated for any given lens assembly which might be employed within an image acquisition device or camera module. Ideally, these would be provided by a lens manufacturer and built into the lens, but in alternative implementations, although onerous, calibrating such functions may need to be performed by a manufacturer incorporating a lens into their device/module.

In any case the sharpness threshold ThrO for the given image can be a function of IAP including: light level, distance to the subject, ISO/gain, exposure time.

As well as calculating a sharpness threshold, in step 44, a sharpness map OldSh, is calculated for the subject region detected within the image acquired at step 40. In a simple implementation, OldSh can comprise a small array or look-up table (LUT) with sharpness measurements for the subject region.

At step 46, based on the estimated distance to the subject, a new assumed-optimal lens position can be determined for example, as explained in PCT Application PCT/EP2015/076881 (Ref: FN-399), the disclosure of which is incorporated herein by reference. So for example, if a region of interest comprising a face is being tracked, then facial anthropometric data such as eye separation distance can be employed to determine, from the size of the imaged face and IAP, the distance of the subject from the image acquisition device.

The lens 12 can then be driven to the focus position (if a change is required) for this distance and a new frame acquired at that position. A sharpness map, NewSh, corresponding to the sharpness map, OldSh is then calculated for that frame.

At step 48, the new map NewSh for the frame is compared to the threshold level calculated at step 44 and compared to the map OldSh for the previous frame acquired at step 40. If the sharpness values for the new map exceed the threshold ThrO and its sharpness improves over the old map, then the focus position used at step 46 is regarded as valid.

There are of course many techniques for performing the comparisons of step 48, for example, that all or a given proportion or number of the sharpness values of NewSh must exceed ThrO and OldSh; or that the aggregate sharpness of NewSh must exceed that of OldSh and that a threshold new of points in NewSh must exceed ThrO.

In this case, the method proceeds to step 50 where a counter TCounter is incremented to signal how long a subject has been successfully tracked and the method continues to acquire a next frame at step 40.

On the other hand, if the adjustment at step 46 fails to improve the sharpness of the tracked subject, then the next step 52 is to assess camera motion (CMP) and subject motion (SMP).

If significant motion is measured in the scene (CMP and SMP are high), the loss of sharpness is attributed to motion rather than loss of focus, and the method continues by waiting for motion to stabilise and acquiring a next frame at step 40 (but without incrementing TCounter) before changing focus position.

Note that the thresholds for CMP and SMP can depend on the exposure time. When exposure time is long, smaller subject/camera motion levels are accepted. When the exposure time is very short (outdoor sunny scenarios), camera motion (hand held) can be neglected and larger subject motion (natural still motion) can be neglected—only significant subject motion (fast sport actions) should be taken into account i.e. the SMP threshold is inversely proportional to exposure time.

On the other hand, if in spite of CMP and SMP being lower than their respective thresholds, sharpness has dropped, then the method proceeds to step 54 where a false counter FCounter is incremented.

At the next step 56, the method tests whether the number of false adjustments performed at step 46, in spite of low CMP/SMP has exceeded a threshold i.e. FCounter>Th2. If at this stage, TCounter is below a threshold, i.e. TCounter<Th1, the method infers that the camera has not been able to track a number (Th2) of subjects for sufficiently long indicating that the camera module may be malfunctioning—at least in respect of being able to perform FDAF. Thus, at step 58, the camera module is marked accordingly, and at step 60, FDAF can be permanently disabled and the camera switches to an alternative AF mode such as CDAF i.e. the method of FIG. 4 will not be employed subsequently. As an alternative to permanently disabling FDAF, the user may be instructed to have the camera re-calibrated.

On the other hand, if the test at step 56 fails, it may mean that the subject being imaged does not in fact exhibit the assumed dimensions on which step 46 is based initially. For example, if the subject is a face and the face detected is a baby face or a large printed face, then the distance between the subject's eyes, a common anthropometric measure used to determine subject distance may not be the nominal 65-70 mm and so the focus position chosen based on this measurement would be incorrect—thus a false face is indicated at step 62. Similarly, if the subject being tracked were a car, then if a printed image of a car either in a magazine or on a billboard were being acquired by the image acquisition device 30, it would not exhibit the nominal dimensions associated with a car.

If a potentially valid updated nominal distance is not available, for example, if a focus sweep has already been performed for a given subject being tracked and should not be re-executed, the process stops without performing a (further) focus sweep and an alternative AF method is set for as long as the current subject region is being tracked (as well as resetting TCounter).

Otherwise, in step 68, the nominal anthropometric measure or dimension being used for the subject can be re-calculated as disclosed in PCT Application No. PCT/EP2015/076881 (Ref: FN-399-PCT), using a focus sweep to determine the focus position at which the subject exhibits maximum contrast and then re-calculating the nominal subject measurement at this distance. Note that this can be the only circumstance where a focus sweep is required. Indeed, if the method were not to attempt to track false faces (or equivalents), then focus sweep would not be required.

Where a focus sweep has been performed in order to determine an optimal focus position for a "false" subject, such as a printed image, the sharpness thresholds calculated and used in steps 44-48 can be adjusted accordingly i.e. as indicated in FIGS. 5 and 6, these may be lower than for a real subject.

Once an optimum focus position associated with an updated nominal size for the subject has been acquired, the method can now return to step 40 to continue as described above and to acquire a subsequent image at that focus position.

Now taking a specific example using the above method, at a given frame #1, a subject such as a face is detected/tracked. On this first frame, the AF position is as before, and the sharpness value (OldSh) is measured for the face region. Based on the distance between the eyes (measured in pixels on the detected face) the distance to the subject is estimated and then a new corresponding lens position is computed. The lens is moved to a new lens position based on this data from step. A new sharpness (NewSh) is computed for the face region in frame #2 acquired at the new lens position. The new sharpness from frame #2 is validated by comparing respective sharpness measurements for the face region in frame #1 and #2, when CMP and SMP are below the acceptable thresholds—the new sharpness from frame #2 should be higher or equal than the sharpness from frame #1. Based on these two measurements, the method decides if the focus position is good or not. If CMP and SMP are high, the method waits for stabilization.

If the new sharpness for frame #2 is not higher or equal than the sharpness for frame #1 and if the new sharpness value is not above a given threshold, the focus position is regarded as not acceptable. There may be reasons for this failure:

The detected face is not a real face (it could be a much smaller or a much larger printed face). In this case the method may need to switch to an alternative AF method e.g. CDAF; or The camera module has become bad (OTP data is invalid, start/stop DAC (digital-to-analog converter) codes for the lens actuator are not good) and the method should switch on an alternative AF method e.g. CDAF. If this failure is happening continuously (for more than Th2 different faces), then the module damage may be irreversible and the FDAF may be completely disabled.

The method of FIG. 4 has been provided for illustrative purposes and it will be appreciated that variants of this approach are possible. For example, the steps 40-46 can be integrated so that each iteration of the method involves acquiring only one new frame with sharpness measurements from the previous iteration being compared with sharpness measurements from a current iteration.

Equally the sharpness threshold ThrO could be calculated based on the IAP for the frame acquired at step 46 rather than the frame acquired at step 40; or indeed as a function of the IAP of both of these and possibly other successively acquired frames.

Also, information for more than one subject region within an image may be taken into account when assessing focus position.

Figure 7:
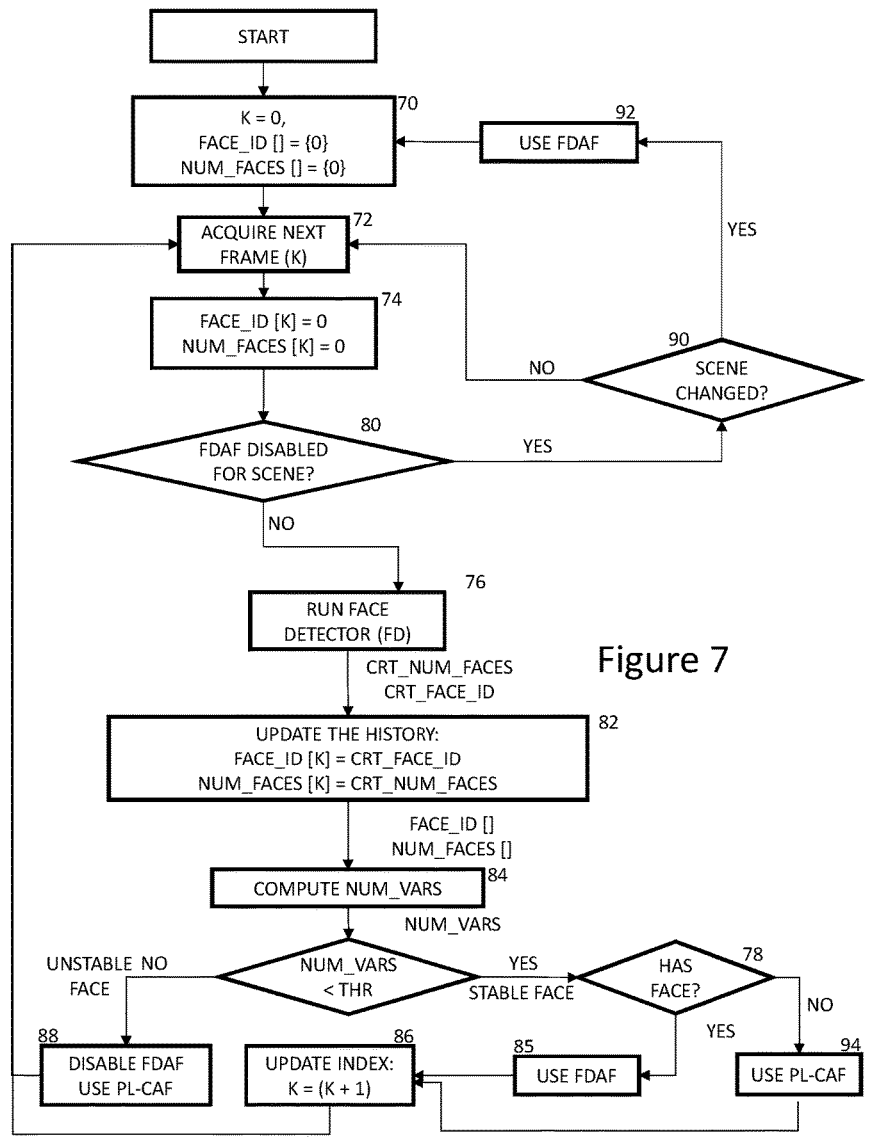
FIG. 7 illustrates a method for acquiring an image according to a second embodiment of the present invention.

Referring now to FIG. 7, a further embodiment is also concerned with determining when to switch between platform based auto-focus techniques including passive techniques such as contrast detection auto-focus (CDAF) or phase based auto-focus and active techniques, commonly referred to below as PL-CAF and face detection auto-focus (FDAF). Although not employing the sharpness measure of the first embodiment, the embodiment is FIG. 7 also takes into account the stability of face detection when switching between focus approaches.

In particular problems can arise when a false face is detected within an image of a scene. As mentioned above, a false face is one in which the distance between the eyes is either significantly larger or smaller than a reference adult eye distance (ED_REF) of between about 65-70 mm.

Consider an image of a scene, captured with focus positioned at a relatively short distance (e.g. 15 cm) from the camera system and containing a small ID badge face having an eye distance 20 mm. A face detection auto-focus (FDAF) system such as disclosed in PCT Application PCT/EP2015/076881 (Ref: FN-399), particularly if it did not test for local sharpness on initially detecting a face might behave in the following manner:

a. A face is detected and, based on an assumed standard eye distance, a focus lens position is computed.

In the case of an ID badge captured at close range, the focus position could be incorrectly estimated close to infinity because the eye distance (20 mm) is much lower than 65-70 mm.

b. The lens system physically moves the lens to the computed focus position.

The resulting image acquired at that focus position would be highly defocused because the subject is actually positioned at a near macro (15 cm) and position, but the lens is focused near infinity.

Because the image is highly defocused, it is expected the face detector is likely to lose the previously detected face. Without a detected face within a last detected image, the system may switch to PL-CAF to focus based on maximizing sharpness at one or more locations or regions of subsequently acquired images. At some stage during such acquisition of subsequent images, the image should become less blurred or fully even focused, so that the original face is redetected.

The workflow could then start again from step (a) resulting in a (possibly infinite) loop.

The same issues could arise in more complex scenarios with multiple false faces where the face on which focus tracking is based can "jump" between faces.

Another possible cause for a tracked face to be lost is the face quality, where usually small faces (e.g. small faces from ID badges) are unclear and face detectors generate unstable detections.

These conditions can induce a fast variation/switching of the tracked face (jumping from one face to another or rapidly redetecting one face) in a short amount of time, which in turn can induce a fast variation of the autofocus states (rapidly alternating between PL-CAF and FDAF or repeatedly triggering FDAF). This can create a strong lens wobble effect with focus shifting back and forwards between macro and infinity positions so degrading the user experience.

The embodiment of FIG. 7 counters this problem by maintaining a record of the number of faces detected within each image of a sequence of up to K images of a scene, NUM_FACES[ ] along with an identifier of a detected face on which FDAF is based in each image of the sequence, FACE_ID [ ].

When the method starts, each of these records is reset, and a sequence counter K is reset to 0. A frame (K) is then acquired at a given focus position, step 72. The tracked face identifier and number of faces for the frame K are initially set to zero/null, step 74. If FDAF has not been disabled for a given scene i.e. within the last K images, step 80, a face detector is then applied to the image, step 76, and this will return a number of faces within the image, CRT_NUM_FACES, as well as an identifier of the face which is to be tracked within the image, CRT_FACE_ID. In a simple implementation, CRT_FACE_ID can indicate the largest face detected within an image, the sharpest face within an image, a face which might previously have been selected by a user within a previous image, or indeed a face corresponding to the CRT_FACE_ID from a previous frame—if this is available. As each new face is detected by the face detector, it allocates a new identifier for the detected face.

Nonetheless, if after starting or after a new scene is detected, an acquired image does not include a face, NUM_FACES[K] and FACE_ID [K] entries will remain null.

This information will eventually be used when determining the stability of a detected face as will be explained in more detail below, but essentially when a face is not present in a frame and face instability has not been detected for a frame, essentially focus remains based on PL-CAF for a subsequent frame, step 94, and the frame index is incremented, step 86, before continuing to the next frame.

Eventually, if an acquired image includes at least one face, the record entries K in NUM_FACES[ ] and FACE_ID [ ] will be updated with non-null values, step 82, with the corresponding information for the current image. A measure of the stability of face detection, NUM_VARs is then calculated at step 84. This will be explained in more detail below, but if NUM_VARs is less than a threshold amount, THR, this indicates face detection has become (or is) stable for the scene. If so, the method can switch to (or continue to operate) using FDAF, step 85, before incrementing the variable K, step 86, and the process continues for the next acquired image, step 72. Note that as before this involves calculating the required lens position based on the assumed or calculated subject size as before and moving the lens to a new focus position.

On the other hand, if at some stage after detecting a face in an image of a scene, NUM_VARS is greater than THR, this indicates face tracking has become unstable and so the camera switches to non-FDAF, i.e. platform based autofocus, PL-CAF, basing focus on image contrast or sharpness or an actively measured subject distance and disables FDAF until the scene changes, step 88. Once the method has switched to PL-CAF and FDAF has been disabled for a scene, there is no need to continue to update the records NUM_FACES[ ], FACE_ID [ ] and sequence counter K for a scene until this changes, but in variants of the embodiment, this preclusion on attempting to switch back to FDAF until a scene has changed may be modified and it may be useful to continue to update the records NUM_FACES[ ], FACE_ID [ ] and sequence counter K for determining when to do so.

Nonetheless, it will be seen that in the embodiment, if auto-focus switches to PL-CAF in response to face detection becoming unstable, the system will essentially continue to rely on this form of auto-focus until a scene being imaged changes, step 90. There are a number of techniques for determining if the scene has changed and one simply relies on camera motion parameters, such as the CMP described in the first embodiment. Thus if CMP parameters indicate that the image camera has moved above a given threshold amount, a decision that the scene has changed can be made. Alternatively or in addition, subject motion parameters, SMP, can be taken into account in determining if the scene has changed. In any case, if the scene has changed, the NUM_FACES[ ] and FACE_ID [ ] vectors as well as the sequence counter K are reset, step 70, as well as (provisionally) enabling FDAF, step 92, before acquiring the next image.

In the embodiment, face detection, step 76, need not be executed after it has been determined that face detection for a scene has become unstable, however, it will be appreciated that face detection could be applied e.g. before step 80, and its results used for other purposes, even if face detection for a scene had become unstable.

Turning now to how NUM_VARS is computed:

In the embodiment, NUM_VARS is defined as the number of face variations for a fixed number of previous frames defined as: $\Sigma_i$ FACE_VAR_COND(FACE_IDS[i],FACE_IDS[i−1])

FACE_VAR_COND(CRT_ID, PREV_ID) is a variation condition for two face IDs defined as a Boolean (1 if TRUE, 0 if FALSE): |CRT_ID−PREV_ID|>A*max(NUM_FACES[ ])+B.

Let us consider some examples where tuning parameters A=1 and B=0; and THR=2.

Example 1

A small printed face (ED=20 mm), which is always detected in the scene by the face detecting step 76.
Frame 1:
Face is detected=>CRT_FACE_ID=1, CRT_NUM_FACES=1
History is updated: FACE_IDS[0]=1, NUM_FACES[0]=1
FACE_IDS[ ]={1}
NUM_FACES[ ]={1}
Max(NUM_FACES[ ])=1
FACE_VAR_COND[0]=0
NUM_VARS=0<2=> do not disable FDAF
The lens is moved to the focus position estimated by FDAF (this position is wrongly estimated because the reference eye distance (ED_REF) is 70 mm)
Frame 2:
The face is still detected (tracked)=>CRT_FACE_ID=1, CRT_NUM_FACES=1
History is updated: FACE_IDS[1]=1, NUM_FACES[1]=1
FACE_IDS[ ]={1, 1}
NUM_FACES[ ]={1, 1}
Max(NUM_FACES[ ])=1
FACE_VAR_COND[1]=[|FACE_IDS[1]−FACE_IDS[0]|>1*1+0]=[0>1]=0
NUM_VARS=FACE_VAR_COND[0]+FACE_VAR_COND[1]=0<2=> do not disable FDAF
The correction sweep will start
Frame 3:
The face is still detected (tracked)=>CRT_FACE_ID=1, CRT_NUM_FACES=1
History is updated: FACE_IDS[2]=1, NUM_FACES[2]=1
FACE_IDS[ ]={1, 1, 1}
NUM_FACES[ ]={1, 1, 1}
Max(NUM_FACES[ ])=1
FACE_VAR_COND[2]=[|FACE_IDS[2]−FACE_IDS[1]|>1*1+0]=[>1]=0
NUM_VARS=FACE_VAR_COND[0]+FACE_VAR_COND[1]+FACE_VAR_COND[2]=0<2=> do not disable FDAF
Correction sweep is in progress
Frame 10:
The face is still detected (tracked)=>CRT_FACE_ID=1, CRT_NUM_FACES=1
History is updated: FACE_IDS[9]=1, NUM_FACES[9]=1

FACE_IDS[ ]={1, 1, 1, 1, 1, 1, 1, 1, 1, 1}
NUM_FACES[ ]={1, 1, 1, 1, 1, 1, 1, 1, 1, 1}
Max(NUM_FACES[ ])=1
FACE_VAR_COND[9]=[|FACE_IDS[9]−FACE_IDS[8]|>1*1+0]=[0>1]=0
NUM_VARS=FACE_VAR_COND[0]+FACE_VAR_COND[1]+FACE_VAR_COND[2]+ . . . +FACE_VAR_COND[9]=0<2=> do not disable FDAF The correction sweep is done, the face is in focus and the eye distance (ED) is properly updated to ED=20 mm as disclosed in PCT Application PCT/EP2015/076881 (Ref: FN-399).

Example 2

A small printed face in the scene (ED=20 mm), is lost after the lens is moved to the estimated position by FDAF and subsequently re-detected.

Frame 1:
Face is detected=>CRT_FACE_ID=1, CRT_NUM_FACES=1
History is updated: FACE_IDS[0]=1, NUM_FACES[0]=1
FACE_IDS[ ]={1}
NUM_FACES[ ]={1}
Max(NUM_FACES[ ])=1
FACE_VAR_COND[0]=0
NUM_VARS=0<2=> do not disable FDAF
The lens is moved to the focus position estimated by FDAF (this position is wrongly estimated because the reference eye distance (ED_REF) is 70 mm)

Frame 2:
The face is lost (by the face detecting step 76) due to the poor image quality, before the correction sweep is done=>CRT_FACE_ID=0, CRT_NUM_FACES=0
History is updated: FACE_IDS[1]=0, NUM_FACES[1]=0
FACE_IDS[ ]={1, 0}
NUM_FACES[ ]={1, 0}
Max(NUM_FACES[ ])=1
FACE_VAR_COND[1]=[|FACE_IDS[1]−FACE_IDS[0]|>1*1+0]=[1>1]=0
NUM_VARS=FACE_VAR_COND[0]+FACE_VAR_COND[1]=0<2=> do not disable FDAF
Note that in the embodiment, after losing the face, PL-CAF will be triggered, step 94.

Frame 3:
The face is still lost=>CRT_FACE_ID=0, CRT_NUM_FACES=0
History is updated: FACE_IDS[2]=0, NUM_FACES[2]=0
FACE_IDS[ ]={1, 0, 0}
NUM_FACES[ ]={1, 0, 0}
Max(NUM_FACES[ ])=1
FACE_VAR_COND[2]=[|FACE_IDS[2]−FACE_IDS[1]|>1*1+0]=[0>1]=0
NUM_VARS=FACE_VAR_COND[0]+FACE_VAR_COND[1]+FACE_VAR_COND[2]=0<2=> do not disable FDAF
Again, having no face in the scene, PL-CAF will be triggered, step 94.

Frame 6:
The face is redetected. The face will receive a new ID obtained by incrementing the ID of the latest tracked face (which was 1)=>CRT_FACE_ID=2, CRT_NUM_FACES=1

History is updated: FACE_IDS[5]=2, NUM_FACES[5]=1
FACE_IDS[ ]={1, 0, 0, 0, 0, 2}
NUM_FACES[ ]={1, 0, 0, 0, 0, 1}
Max(NUM_FACES[ ])=1
FACE_VAR_COND[5]=[|FACE_IDS[5]−FACE_IDS[4]|>1*1+0]=[2>1]=1
NUM_VARS=FACE_VAR_COND[0]+FACE_VAR_COND[1]+FACE_VAR_COND[2]+ . . . +FACE_VAR_COND[5]=1<2=> do not disable FDAF
The lens is moved to the focus position estimated by FDAF (this position is wrongly estimated because the reference eye distance (ED_REF) is 70 mm)

Frame 7:
The face is lost (by the face detecting step 76) due to the poor image quality, before the correction sweep is done=>CRT_FACE_ID=0, CRT_NUM_FACES=0
History is updated: FACE_IDS[6]=0, NUM_FACES[6]=0
FACE_IDS[ ]={1, 0, 0, 0, 0, 2, 0}
NUM_FACES[ ]={1, 0, 0, 0, 0, 1, 0}
Max(NUM_FACES[ ])=1
FACE_VAR_COND[6]=[|FACE_IDS[6]−FACE_IDS[5]|>1*1+0]=[2>1]=1
NUM_VARS=FACE_VAR_COND[0]+FACE_VAR_COND[1]+FACE_VAR_COND[2]+ . . . +FACE_VAR_COND[6]=2 (which is not lower that THR(2)=>Disable FDAF)
Losing the face, PL-CAF will be triggered and FDAF disabled for the scene, step 88.

It will be seen that using the above values for tuning parameters A and B and THR allows a detected face to be lost once and re-detected, but if it is subsequently lost, face detection is regarded as being unstable and is disabled for a scene. Clearly varying these parameters enables flexibility in the degree to which face detection can vary before it is disabled.

As in the first embodiment, the disclosed techniques are not limited to a subject comprising a face and are equally applicable to attempting to track any subject with an assumed reference dimension.

While the second embodiment has been described separately from the first, it will be appreciated that each of these could run in parallel on a given device. Then, if FDAF is disabled by either one for a given scene—it can supersede FDAF status determined by the other method. Thus, the methods can be regarded as complimentary, rather than mutually exclusive.

As well as assisting in acquiring visible images, embodiments can be employed to acquire in-focus infra-red images of a human iris typically used for performing biometric identification and authentication of a device user.

The invention claimed is:

1. A method for acquiring an image comprising:
   acquiring a sequence of image frames of a given scene;
   detecting within each image frame any region containing a subject with a reference subject size;
   recording an identifier of any region containing such a subject on which auto-focus might be based;
   determining a number of variations of subject identifiers for a given number of frames preceding a given frame in said sequence;
   responsive to said number of variations exceeding a threshold, disabling subject based auto-focus for subsequent frames until at least a condition for a given scene is met;

responsive to said number of variations not exceeding a threshold in a given frame containing at least one subject, utilising subject based auto-focus for acquisition of at least a subsequent frame in said sequence; and otherwise using non-subject based auto-focus for at least a subsequent frame in said sequence.

2. A method according to claim 1 wherein said number of variations is defined as a sum of changes of identifiers of subjects on which auto-focus might be based in previous pairs of successive frames of a given scene.

3. A method according to claim 1, wherein determining a change of identifiers between a successive pair of frames is modified by at least one tuning parameter and a maximum number of detected subjects in any image frame of a scene.

4. A method according to claim 1 wherein a face detection based auto-focus comprises:
   checking if a lens actuator setting for acquiring a given image frame provides maximum sharpness for a region of said image frame including a detected subject on which auto-focus might be based; and
   responsive to said sharpness not being maximal:
   determining a lens actuator setting providing a maximum sharpness for the region of said image frame including said detected subject;
   determining a lens displacement corresponding to said lens actuator setting;
   calculating a distance to said subject based on said lens displacement;
   determining a dimension of said subject as a function of said distance to said subject, said imaged subject size and a focal length of a lens assembly with which said image frame was acquired; and
   tracking said subject through at least one subsequent image frame of said scene including auto-focussing on said subject using said determined dimension of said subject; and
   responsive to said sharpness being maximal, tracking said subject through at least one subsequent image frame of said scene including auto-focussing on said subject using said reference subject size.

5. A method according to claim 1 wherein said subject comprises a face and wherein said reference subject size is a distance between eye regions of said face.

6. A method according to claim 1 wherein said condition for a given scene comprises detecting a change of scene.

7. A method according to claim 6 wherein a change of scene is based on an assessment of one or more of: camera motion and subject motion.

8. An image acquisition device comprising an auto-focus module arranged to acquire image acquisition, subject motion and camera motion parameters for an acquired image frame; and to perform the method of claim 1.

9. A computer program product comprising a non-transitory computer readable medium on which computer executable instructions are stored which when executed on an image acquisition device are arranged to perform the method of claim 1.

* * * * *